United States Patent
Uoshita et al.

(10) Patent No.: US 12,461,235 B2
(45) Date of Patent: Nov. 4, 2025

(54) SHIP MONITORING SYSTEM, SHIP MONITORING METHOD, AND INFORMATION PROCESSING DEVICE

(71) Applicant: Furuno Electric Co., Ltd., Nishinomiya (JP)

(72) Inventors: Seiichi Uoshita, Nishinomiya (JP); Kazuya Nakagawa, Amagasaki (JP); Yuichi Takebayashi, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 254 days.

(21) Appl. No.: 18/136,896

(22) Filed: Apr. 20, 2023

(65) Prior Publication Data
US 2023/0296765 A1    Sep. 21, 2023

Related U.S. Application Data
(63) Continuation-in-part of application No. PCT/JP2021/034750, filed on Sep. 22, 2021.

(30) Foreign Application Priority Data
Oct. 23, 2020    (JP) ................ 2020-177693

(51) Int. Cl.
    *G01S 13/937*    (2020.01)
(52) U.S. Cl.
    CPC ................. *G01S 13/937* (2020.01)
(58) Field of Classification Search
    CPC ................................................. G01S 13/937
    See application file for complete search history.

(56) References Cited

U.S. PATENT DOCUMENTS
| | | | | |
|---|---|---|---|---|
| 10,338,800 | B2* | 7/2019 | Rivers | G01S 13/937 |
| 2009/0315756 | A1* | 12/2009 | Imazu | B63B 49/00 |
| | | | | 342/41 |

(Continued)

FOREIGN PATENT DOCUMENTS
| | | |
|---|---|---|
| GB | 2428151 A | 1/2007 |
| JP | 63-69000 A | 3/1988 |

(Continued)

OTHER PUBLICATIONS
International Search Report and Written Opinion mailed on Nov. 2, 2021, received for PCT Application PCT/JP2021/034750, filed on Sep. 22, 2021, 8 pages including English Translation.

(Continued)

*Primary Examiner* — Anil K Bhargava
(74) *Attorney, Agent, or Firm* — XSENSUS LLP

(57) ABSTRACT

The present disclosure provides a ship monitoring system capable of improving legibility of an OZT. The ship monitoring system includes a first data generator, a second data generator, and processing circuitry. The first data generator generates first ship data indicative of a position and a velocity of a first ship. The second data generator generates second ship data indicative of a position and a velocity of a second ship. The processing circuitry calculates a risk value indicative of a risk of a collision between the first ship and the second ship based on the first ship data and the second ship data, for each point on an estimated course of the second ship, when the first ship is assumed to change a course and reach the point. The processing circuitry specifies a range where two or more continuous points have the risk values above a threshold. The processing circuitry displays a risk range including the range where the two or more continuous points have the risk values above the threshold.

14 Claims, 4 Drawing Sheets

(56) References Cited

U.S. PATENT DOCUMENTS

2012/0265380 A1* 10/2012 Kuwata ............... G05D 1/0206
                                                    701/21
2017/0284807 A1* 10/2017 Saito ....................... G08G 3/00
2022/0326018 A1* 10/2022 Rivers ..................... G01S 13/86
2022/0348297 A1* 11/2022 Nakagawa .............. B63B 49/00

FOREIGN PATENT DOCUMENTS

WO         2020/003856 A1    1/2020
WO     WO-2020008776 A1 *    1/2020

OTHER PUBLICATIONS

Mazu et al., "Obstacle Zone by Target and its Expression", The Journal of Japan Institute of Navigation, vol. 107, 2002, pp. 191-197 (7 pages including English Abstract).
Extended European search report issued on Jun. 17, 2024, in corresponding European patent Application No. 21882496.9, 8 pages.

* cited by examiner

OTHER SHIPS MANAGEMENT DATABASE

| OTHER SHIPS SPECIFIER | POSITION | VELOCITY | | ... |
| --- | --- | --- | --- | --- |
| | | SPEED | BEARING | |
| 001 | x1,y1 | v1 | d1 | ... |
| 002 | x2,y2 | v2 | d2 | ... |
| 003 | x3,y3 | v3 | d3 | ... |

EXAMPLE OF INDICATION (CONVENTIONAL)

SHIP MONITORING SYSTEM, SHIP MONITORING METHOD, AND INFORMATION PROCESSING DEVICE

CROSS-REFERENCE TO RELATED APPLICATIONS

The application is a bypass continuation-in-part of PCT International Application No. PCT/JP2021/034750, filed Sep. 22, 2021, which claims priority under 35 U.S.C. § 119 to Japanese Patent Application No. 2020-177693, which was filed on Oct. 23, 2020, the entire disclosure of each are hereby incorporated by reference.

TECHNICAL FIELD

The present disclosure relates to a ship monitoring system, a ship monitoring method, an information processing device, and a program.

BACKGROUND ART

Conventionally, various techniques for evaluating a risk of a collision of ships exist. For example, Nonpatent Document 1 discloses a technique for displaying an OZT (Obstacle Zone by Target) as a risk range.

REFERENCE DOCUMENT(S) OF CONVENTIONAL ART

Patent Document

[Nonpatent Document 1] IMAZU, Hayama, FUKUTO, Junji, and NUMANO, Masayoshi, "Obstacle Zone by Target and its Expression", The Journal of Japan Institute of Navigation, 2002, Vol. 107, pp. 191-197

DESCRIPTION OF THE DISCLOSURE

Problem(s) to be Solved by the Disclosure

Meanwhile, according to the technique for displaying the OZT as the risk range, since a plurality of circular OZTs are displayed in an overlapped manner on estimated courses of other ships, the legibility may be low.

The present disclosure is made in view of the above-described problem, and a main purpose thereof is to provide a ship monitoring system, a ship monitoring method, an information processing device, and a program, capable of improving legibility of a risk range.

SUMMARY OF THE DISCLOSURE

In order to solve the above-described problem, a ship monitoring system according to one aspect of the present disclosure includes a first data generator, a second data generator, a risk value calculator, a range specifier, and a display unit. The first data generator generates first ship data indicative of a position and a velocity of a first ship. The second data generator generates second ship data indicative of a position and a velocity of a second ship. The risk value calculator calculates a risk value indicative of a risk of a collision between the first ship and the second ship based on the first ship data and the second ship data, for each point on an estimated course of the second ship, when the first ship is assumed to change a course and reach the point. The range specifier specifies a range where two or more continuous points have the risk values above a threshold. The display unit displays a risk range including the range where the two or more continuous points have the risk values above the threshold.

Further, a ship monitoring method according to another aspect of the present disclosure includes generating, by a first data generator, first ship data indicative of a position and a velocity of a first ship, generating, by a second data generator, second ship data indicative of a position and a velocity of a second ship, calculating a risk value indicative of a risk of a collision between the first ship and the second ship based on the first ship data and the second ship data, for each point on an estimated course of the second ship, when the first ship is assumed to change a course and reach the point, specifying a range where two or more continuous points have the risk values above a threshold, and displaying a risk range including the range where the two or more continuous points have the risk values above the threshold.

Further, an information processing device according to another aspect of the present disclosure includes a risk value calculator, a range specifier, and a display controller. The risk value calculator calculates a risk value indicative of a risk of a collision between a first ship and a second ship based on first ship data indicative of a position and a velocity of the first ship and second ship data indicative of a position and a velocity of the second ship, for each point on an estimated course of the second ship, when the first ship is assumed to change a course and reach the point. The range specifier specifies a range where two or more continuous points have the risk values above a threshold. The display controller displays a risk range including the range where the two or more continuous points have the risk values above the threshold.

Further, a program according to another aspect of the present disclosure causes a computer to execute processing which includes calculating a risk value indicative of a risk of a collision between a first ship and a second ship based on first ship data indicative of a position and a velocity of the first ship and second ship data indicative of a position and a velocity of the second ship, for each point on an estimated course of the second ship, when the first ship is assumed to change a course and reach the point, specifying a range where two or more continuous points have the risk values above a threshold, and displaying a risk range including the range where the two or more continuous points have the risk values above the threshold.

Effect of the Disclosure

According to the present disclosure, it becomes possible to improve the legibility of the risk range.

MODE FOR CARRYING OUT THE DISCLOSURE

Hereinafter, one embodiment of the present disclosure is described with reference to the drawings.

Figures 1, 2:
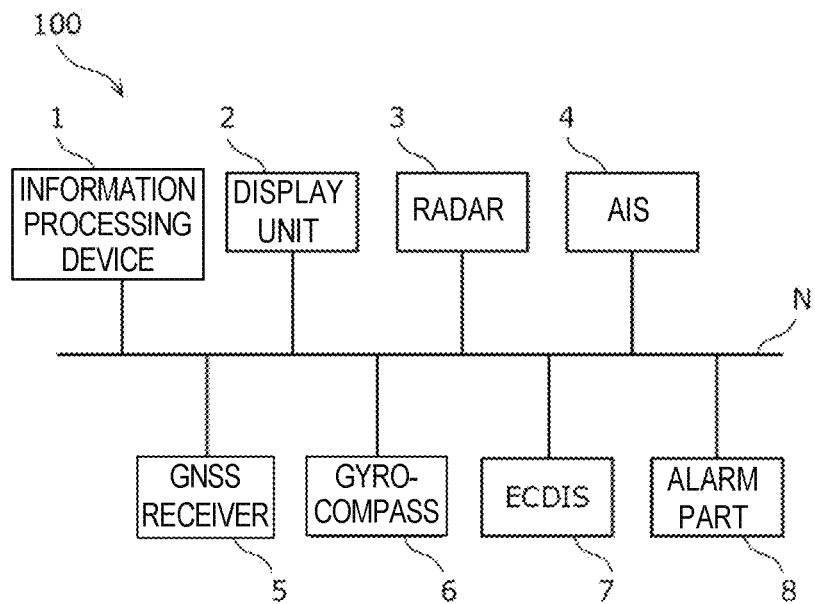
FIG. 1 is a view illustrating one example of a configuration of a ship monitoring system according to one embodiment.
FIG. 2 is a view illustrating one example of other ships management database.

FIG. 1 is a block diagram illustrating one example of a configuration of a ship monitoring system 100 according to this embodiment. A ship monitoring method according to one embodiment may be implemented in this ship monitoring system 100. The ship monitoring system 100 may be a system which is mounted on a ship (hereinafter, referred to as "the ship") and monitors other ships which exist around the ship.

The ship on which the ship monitoring system 100 is mounted is one example of a first ship, and is referred to as "the ship" in the following description. Further, ship(s) which exists around the ship is one example of a second ship, and is referred to as "another ship" or "other ships" in the following description.

Moreover, in the following description, a "velocity" is a vector quantity (a so-called "ship velocity vector") indicative of a speed and a direction, and a "speed" is a scalar quantity.

The ship monitoring system 100 may include an information processing device 1, a display unit 2, a radar 3, an AIS 4, a GNSS receiver 5, a gyrocompass 6, an ECDIS 7, and an alarm part 8. These apparatuses may be connected to a network N (for example, LAN), and may be capable of mutual network communications.

The information processing device 1 may be a computer including processing circuitry 10 as software or hardware, a CPU, a RAM, a ROM, a nonvolatile memory, and an input/output interface. The CPU of the information processing device 1 may perform information processing according to a program loaded to the RAM from the ROM or the nonvolatile memory.

The program may be supplied via an information storage medium (for example, an optical disc or a memory card), and may be supplied via the communication network (for example, the Internet or the LAN).

The display unit 2 may be a display device with a touch sensor, for example. The touch sensor may detect a position inside a screen which is specified by a finger etc. The specified position may be inputted not only by the touch sensor but also by a trackball etc.

The radar 3 may transmit a radio wave around the ship, receive a reflection wave thereof, and generate echo data based on a reception signal. Further, the radar 3 may discriminate a target object from echo data, and generate Target Tracking data (TT data) indicative of a position and a velocity of the target object.

The AIS (Automatic Identification System) 4 may receive AIS data from other ship(s) or a land control which exists around the ship. Without being limited to the AIS, a VDES (VHF Data Exchange System) may also be used. The AIS data may contain a position, a velocity, etc. of another ship.

The GNSS receiver 5 may detect a position of the ship based on the radio wave received from a GNSS (Global Navigation Satellite System). The gyrocompass 6 may detect a heading of the ship. Without being limited to the gyrocompass, a GPS compass or a magnetic compass may also be used.

The ECDIS (Electronic Chart Display and Information System) 7 may acquire the position of the ship from the GNSS receiver 5, and display the position of the ship on an electronic nautical chart. Further, the ECDIS 7 may also display a scheduled route of the ship on the electronic nautical chart. Without being limited to ECDIS, a GNSS plotter may also be used.

The alarm part 8 may give an alarm, when there is a risk of the ship colliding with another ship. For example, the alarm part 8 may give an alarm by indication, or may give an alarm by sound or light. The alarm by indication may be performed by the display unit 2. That is, the display unit 2 may also serve as the alarm part 8.

Although in this embodiment the information processing device 1 is an independent device, without being limited to this configuration, it may be integrated with another device, such as the ECDIS 7. That is, a functional part of the information processing device 1 may be implemented by another device, such as the ECDIS 7.

Further, although the display unit 2 is also an independent device, without being limited to this configuration, a display unit of another device, such as the ECDIS 7, may also be used as the display unit 2 which displays an image generated by the information processing device 1.

In this embodiment, a set of the GNSS receiver 5 and the ECDIS 7 is one example of a first data generator, and may generate the-ship data indicative of the position and the velocity of the ship. In detail, the GNSS receiver 5 may detect the position of the ship, and the ECDIS 7 may detect the velocity of the ship based on a temporal change in the position of the ship.

Without being limited to this configuration, the velocity of the ship may be detected based on the heading of the ship detected by the gyrocompass 6, and a speed of the ship detected by a ship speed meter (not illustrated).

Further, the radar 3 or the AIS 4 is one example of a second data generator, which generates other-ships data indicative of positions and velocities of other ships. In detail, the TT data generated by the radar 3 may correspond to the other-ships data. Further, the AIS data generated by the AIS 4 may also correspond to the other-ships data.

FIG. 2 is a view illustrating one example of the other ships management database which is built in the memory of the information processing device 1. The other-ships data generated by the radar 3 or the AIS 4 may be registered to the other ships management database.

The other ships management database may include fields of "other ships specifier," "position," "speed," and "bearing." Note that the positions and the bearings of other ships which are detected by the radar 3 may be converted into a coordinate system which is the same as the GNSS.

Figure 3:
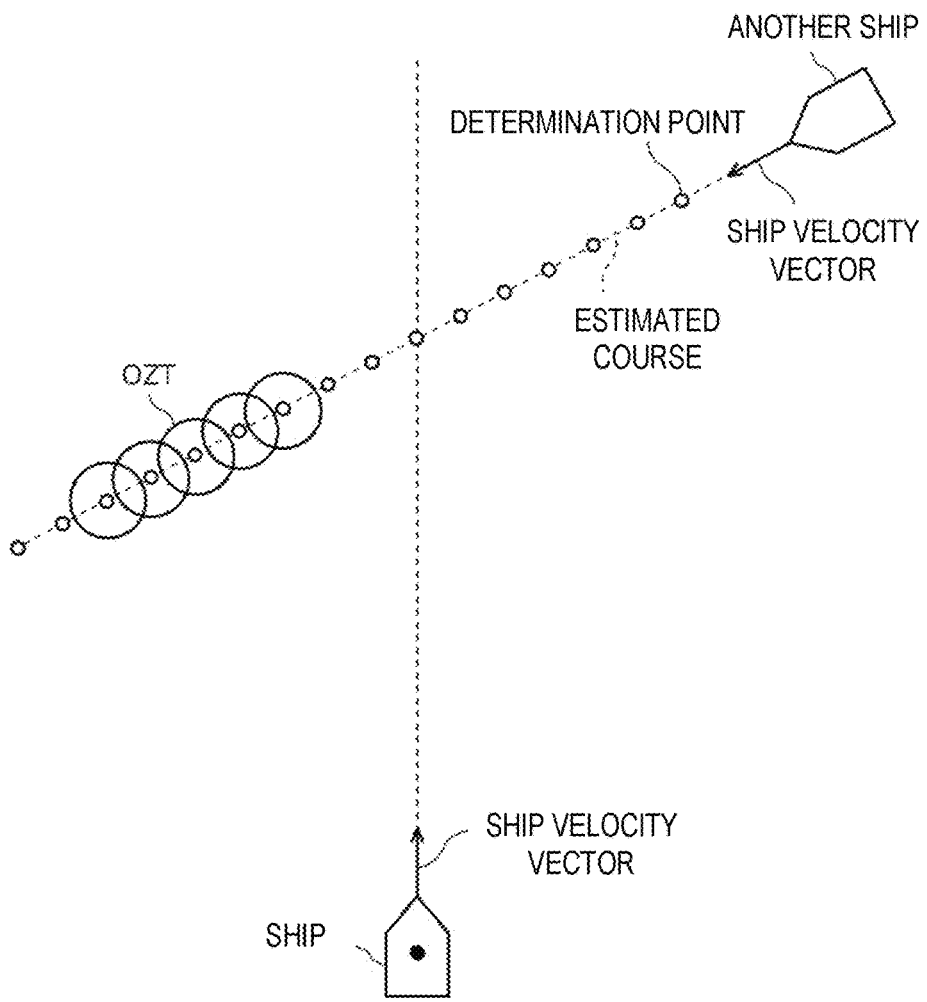
FIG. 3 is a view illustrating one example of indication of an OZT (conventional example).

FIG. 3 is a view illustrating one example of indication of an OZT (conventional example). The OZT (Obstacle Zone by Target) may be a zone where a cruise of the ship is blocked by another ship, and may be displayed on an estimated course of another ship.

According to the technique for indicating the OZT, a risk value of a collision may be calculated at each of a plurality of determination points which are discretely set on the estimated course of another ship, and a circular OZT may be indicated at the determination point where the risk value is above a threshold. When there are continuous determination points with the risk values above the threshold, irregularity may arise on the edges of the plurality of OZTs which are drawn so as to be overlapped with each other, and there is a possibility that the legibility may fall.

Although it is possible to reduce the irregularity of the edges of the plurality of OZTs by shortening an interval of the determination points, another problem that the calculation load increases may arise. On the other hand, if the interval of the determination points is set longer than a diameter of the OZT, the OZT may be no longer displayed at the position where the OZT is to be displayed. Therefore, the interval of the determination points may be limited to below the diameter of the OZT.

Thus, in this embodiment, as will be described below, the legibility may be improved by displaying a comprehensive OZT including two or more determination points as a risk range.

Figure 4:
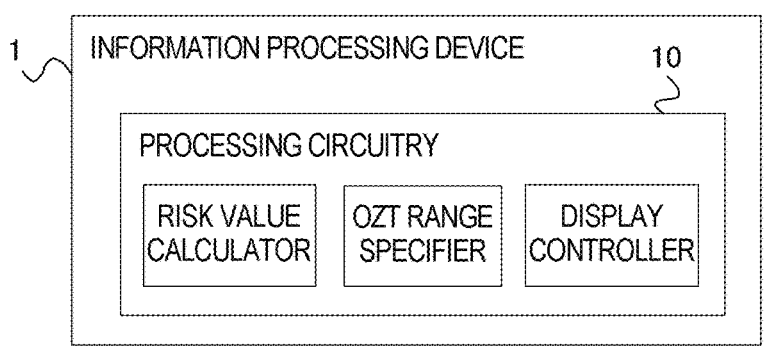
FIG. 4 is a view illustrating one example of a configuration of an information processing device according to one embodiment.
Figure 5:
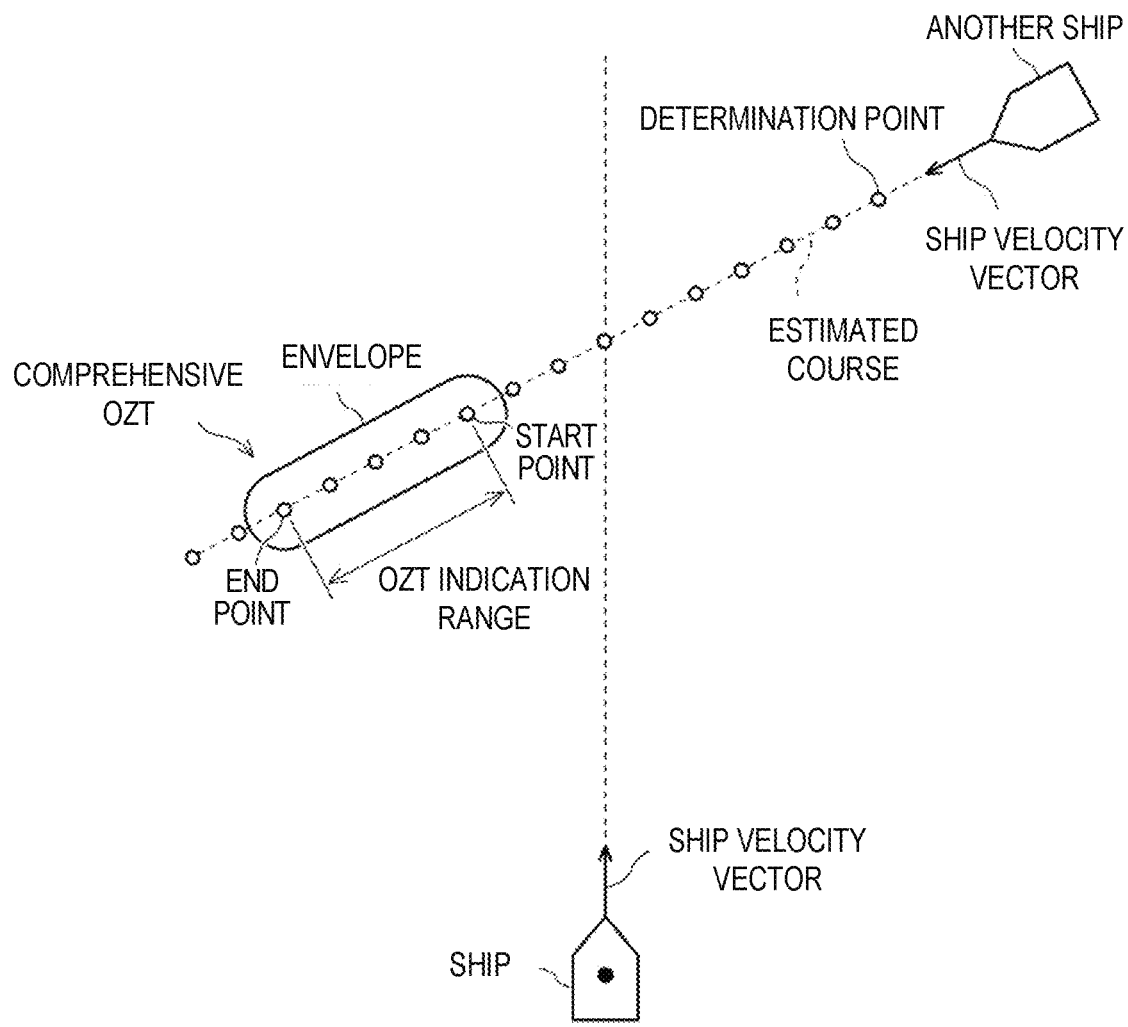
FIG. 5 is a view illustrating one example of indication of a comprehensive OZT.

FIG. 4 is a view illustrating one example of a configuration of the information processing device 1 according to one embodiment which implements the ship monitoring method according to one embodiment. The information processing device 1 may include a risk value calculator 11, an OZT range specifier 12, and a display controller 13. These functional parts may be implemented by the CPU of the information processing device 1 performing the information processing according to the program. FIG. 5 is a view illustrating one example of indication of the comprehensive OZT. The comprehensive OZT is one example of the risk range.

The risk value calculator 11 may calculate, for each determination point on the estimated course of another ship, the risk value indicative of the risk of the ship colliding with another ship, when assuming that the ship changes the course and reaches this determination point, based on the the-ship data and the other-ships data. A known technique for indicating the OZT may be used for the calculation of the risk value.

In detail, the risk value calculator 11 may calculate a probability that the ship and another ship coexist at the determination point simultaneously, when assuming that the ship reaches this determination point by changing the course from the present position while maintaining its speed, and another ship reaches the same determination point from the present position while maintaining its speed, as the risk value of the collision. Moreover, the determination points with the risk values above the threshold may be used as OZT indicating points.

The OZT range specifier 12 may specify a range where two or more continuous points have the risk values above the threshold (OZT indicating points), as an OZT indication range. In detail, the OZT range specifier 12 may specify an OZT indicating point which is a start point and an OZT indicating point which is an end point, among the range where two or more continuous OZT indicating points exist.

The display controller 13 may display on the display unit 2 (see FIG. 1) the comprehensive OZT including the range where two or more continuous points have the risk values above the threshold (OZT indication range). As illustrated in FIG. 5, the comprehensive OZT may be displayed as the displayed image, along with a symbol of the ship, a heading line of the ship, and a symbol of another ship, and the estimated course of another ship.

In detail, the comprehensive OZT may have a shape which extends in the same direction as the estimated course of another ship (for example, a rounded rectangular shape with semicircular ends). Without being limited to this shape, the comprehensive OZT may have an elliptical shape. Among the edge of the comprehensive OZT, a part between the start point and the end point may be straight extending along the estimated course of another ship (hereinafter, referred to as an "envelope").

A safety separation distance defined beforehand may be used as an interval between the envelope of the comprehensive OZT and the estimated course of another ship, and as a radius of the semicircles at the both ends of the comprehensive OZT, similarly to the radius of the conventional circular OZT (see FIG. 3).

Note that, although in the above description the straight lines which connect the semicircles at the both ends of the comprehensive OZT are referred to as the "envelope" for convenience, this envelope may not be obtained by actually reducing the interval of the determination points and placing a large number of circular OZTs in line.

As described above, in this embodiment, since the comprehensive OZT is displayed in the range where two or more continuous points have the risk values above the threshold, it becomes possible to improve the legibility. Particularly, since the comprehensive OZT has the linear edge extending along the estimated course of another ship, the legibility is improved as compared with the conventional irregular edge.

Figure 6:
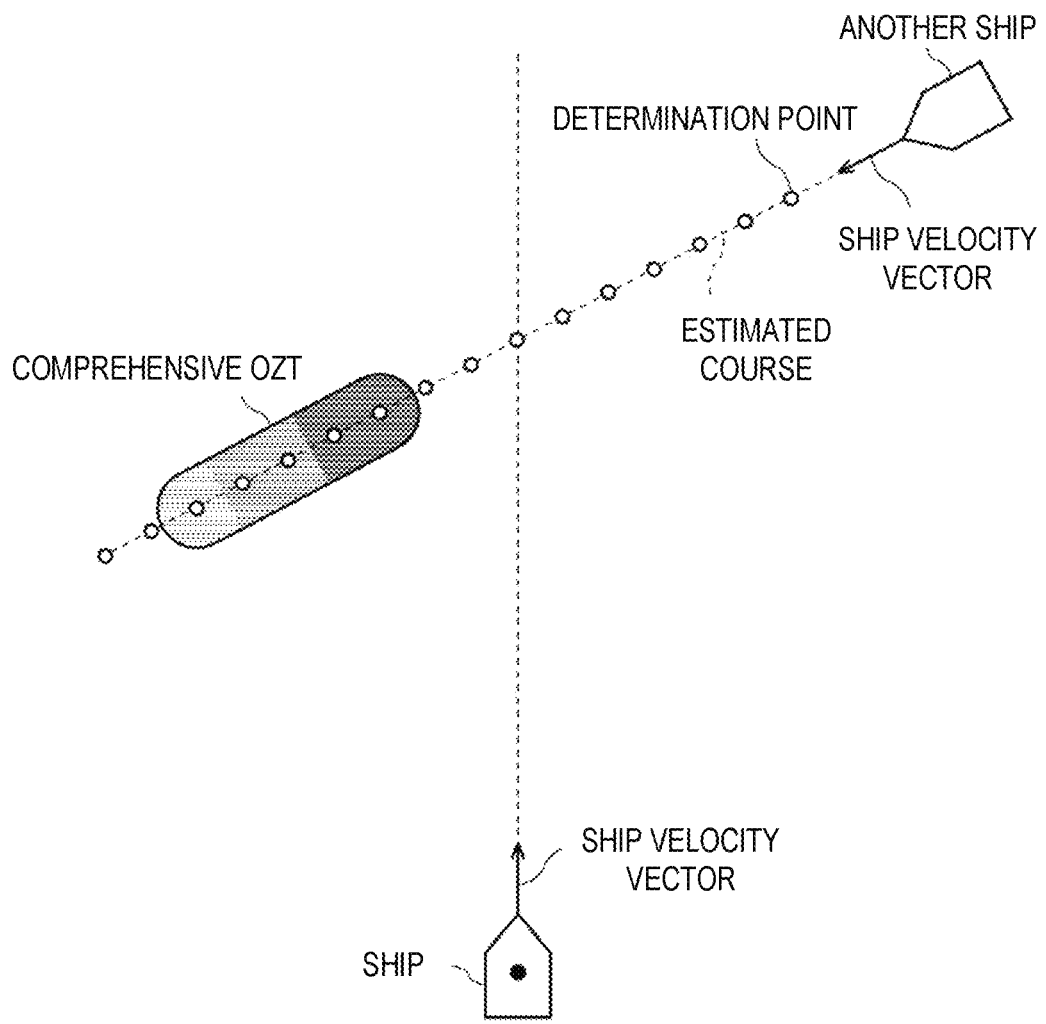
FIG. 6 is a view illustrating a modification of one example of indication of the comprehensive OZT.

As illustrated in FIG. 6, the display controller 13 may change the display mode of the comprehensive OZT according to the risk value of each determination point included in the comprehensive OZT. In detail, for example, the shade of a part to which each determination point of the comprehensive OZT belongs is changed so as to be deeper as the risk value increases. Without being limited to this configuration, other display modes, such as color or texture, may be changed.

Although the embodiment of the present disclosure is described above, the present disclosure is not limited to this embodiment, and it is needless to say that various changes are possible for the person skilled in the art.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Information Processing Device, 2 Display Unit, 3 Radar, 4 AIS, 5 GNSS Receiver, 6 Gyrocompass, 7 ECDIS, 8 Alarm Part, 11 Risk Value Calculator, 12 OZT Range Specifier, 13 Display Controller, 100 Ship Monitoring System

The invention claimed is:
1. A ship monitoring system, comprising:
processing circuitry configured to:
generate first ship data indicative of a current position, a current course and a current velocity of a first ship,
generate second ship data indicative of a current position, a current course and a current velocity of a second ship,
calculate a risk value indicative of a risk of a collision between the first ship and the second ship based on the first ship data and the second ship data, for each of a plurality of risk determination points located on the current course of the second ship, and
while maintaining the current course of the first ship;

recalculate the risk value of each of a plurality of risk determination points located on the current course of the second ship based on an assumption that the current course of the first ship will change, so as to identify whether two or more continuous risk determination points of the plurality of risk determination points would have corresponding risk values above a threshold based on the assumption that the current course of the first ship will change, and upon determining that the two or more continuous risk determination points of the plurality of risk determination points would have corresponding risk values above the threshold based on the assumption that the current course of the first ship will change, display a risk range icon that encompasses the two or more continuous risk determination points having the corresponding risk values above the threshold based on the assumption that the current course of the first ship will change.

2. The ship monitoring system of claim 1, wherein the processing circuitry specifies a risk starting determination point and a risk ending determination point of the risk range icon that encompasses the two or more continuous risk determination points having the corresponding risk values above the threshold.

3. The ship monitoring system of claim 1, wherein the risk range icon has a long axis that extends in the same direction as the current course of the second ship.

4. The ship monitoring system of claim 2, wherein the risk range icon has an elongated shape having a long axis that coincides with the current course of the second ship.

5. The ship monitoring system according to claim 1, wherein the risk range icon has an elongated shape having side edges that are parallel with the current course of the second ship.

6. The ship monitoring system according to claim 4, wherein the risk range icon has side edges that are parallel with the current course of the second ship.

7. The ship monitoring system according to claim 1, wherein the processing circuitry changes a display mode of the risk range icon according to the risk value of each of the risk determination points encompassed by the risk range icon.

8. The ship monitoring system according to claim 6, wherein the processing circuitry changes a display mode of the risk range icon according to the risk value of each of the risk determination points encompassed by in the risk range icon.

9. The ship monitoring system of claim 7, wherein, according to the risk value of each of the risk determination points encompassed by the risk range icon, the processing circuitry changes a shade of a part to which the risk determination point belongs.

10. The ship monitoring system of claim 8, wherein, according to the risk value of each of the risk determination points encompassed by the risk range icon, the processing circuitry changes a shade of a part to which the risk determination point belongs.

11. The ship monitoring system according to claim 1, wherein the first ship data is generated by a GNSS receiver that is mounted on the first ship and is configured to detect the position of the first ship based on a radio wave received from a GNSS (Global Navigation Satellite System).

12. The ship monitoring system according to claim 1, wherein the second data is generated by a radar that is mounted on the first ship and is configured to detect the position and the velocity of the second ship based on echo data generated by receiving a reflection wave of the radio wave transmitted around the first ship.

13. A ship monitoring method, comprising the steps of:
generating first ship data indicative of a current position, a current course and a current velocity of a first ship;
generating second ship data indicative of a current position, a current course and a current velocity of a second ship;
calculating a risk value indicative of a risk of a collision between the first ship and the second ship based on the first ship data and the second ship data, for each of a plurality of risk determination points located on the current course of the second ship;
while maintaining the current course of the first ship, recalculating the risk value of each of a plurality of risk determination points located on the current course of the second ship based on an assumption that the current course of the first ship will change, so as to identify whether two or more continuous risk determination points of the plurality of risk determination points would have corresponding risk values above a threshold based on the assumption that the current course of the first ship will change; and
upon determining that the two or more continuous risk determination points of the plurality of risk determination points would have corresponding risk values above the threshold based on the assumption that the current course of the first ship will change, displaying a risk range icon that encompasses the two or more continuous risk determination points having the corresponding risk values above the threshold based on the assumption that current course of the first ship will change.

14. An information processing device, comprising:
processing circuitry configured to:
calculate a risk value indicative of a risk of a collision between a first ship and a second ship based on first ship data indicative of a current position, a current course and a current velocity of the first ship and second ship data indicative of a current position, a current course and a current velocity of the second ship, for each of a plurality of risk determination points located on the current course of the second ship,
while maintaining the current course of the first ship, recalculate the risk value of each of a plurality of risk determination points located on the current course of the second ship based on an assumption that the current course of the first ship will change, so as to identify whether two or more continuous risk determination points of the plurality of risk determination points would have corresponding risk values above a threshold based on the assumption that if the current course of the first ship will change, and
upon determining that the two or more continuous risk determination points of the plurality of risk determination points would have corresponding risk values above the threshold based on the assumption that the current course of the first ship will change, display a risk range icon that encompasses the two or more continuous risk determination points having the corresponding risk values above the threshold based on the assumption that the current course of the first ship will change.

* * * * *